O. M. ALEXANDER.
FRICTION CLUTCH.
APPLICATION FILED DEC. 4, 1914.
1,139,249.
Patented May 11, 1915.
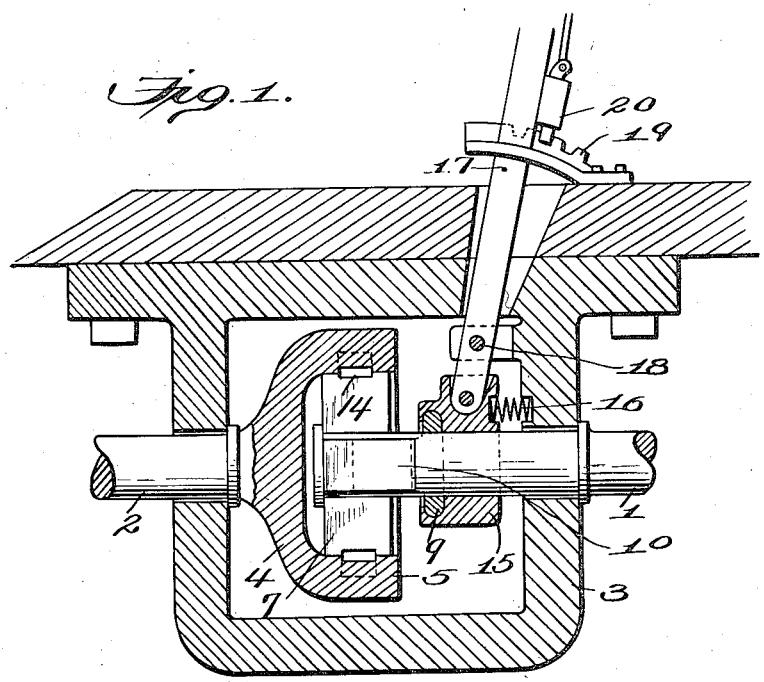
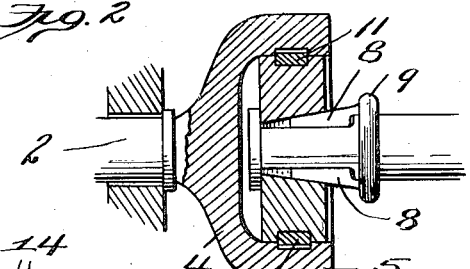
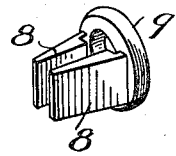
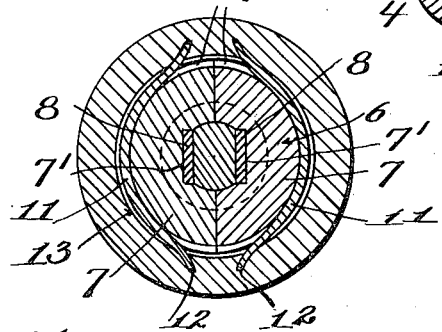
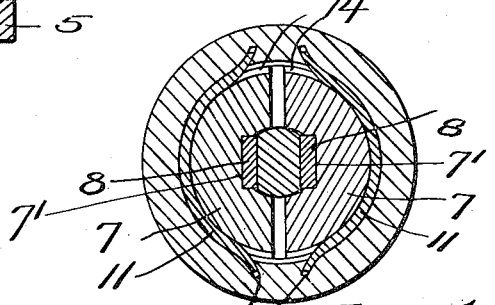
Witnesses:
Inventor
Olin M. Alexander
by
James L. Norris,
Attorney

UNITED STATES PATENT OFFICE.

OLIN M. ALEXANDER, OF ANNISTON, ALABAMA.

FRICTION-CLUTCH.

1,139,249.     Specification of Letters Patent.     Patented May 11, 1915.

Application filed December 4, 1914. Serial No. 875,535.

*To all whom it may concern:*

Be it known that I, OLIN M. ALEXANDER, a citizen of the United States, residing at Anniston, in the county of Calhoun and State of Alabama, have invented new and useful Improvements in Friction-Clutches, of which the following is a specification.

This invention relates to improvements in friction clutches, proposing a friction clutch which is especially designed as a part of a change speed gearing for transmitting power from one shaft to another, a specific application of the improved clutch being its use in automobile transmission gearing as a connecting element between the crank shaft or a shaft driven thereby and a shaft employed to drive the wheels of the vehicle.

The objects of the invention are to provide a friction clutch of the character stated which permits of an easy and accurate regulation of the speed of the driven shaft and which is specially constructed whereby transmission from lower to higher speeds shall be easy and gradual and without shock.

Other objects and advantages will appear as the description proceeds.

An embodiment of the invention is illustrated in the accompanying drawings, wherein:—

Figure 1 is a vertical longitudinal sectional view of a friction clutch in which the features of the invention are incorporated; Fig. 2 is a horizontal sectional view thereof; Figs. 3 and 4 are vertical cross-sectional views showing different relations of the parts, Fig. 3 showing the driven member substantially free of the driving member, and Fig. 4 showing the said driven and driving members coupled together whereby the latter operates the former. Fig. 5 is a detail perspective view showing the means employed for expanding the inner member of the clutch.

Similar characters of reference designate corresponding parts throughout the several views.

The two shafts between which power is transmitted are indicated at 1 and 2 and it may be assumed that 1 is the driving shaft and 2 the driven shaft. In the embodiment disclosed, these shafts are arranged in coaxial or alining relation and are journaled in the walls of a casing 3 which incloses the gearing of which the clutch forms a part, and is suitably secured to the frame of the vehicle. The shaft 2 within the casing 3 is formed with a bell-shaped end 4 which provides a driving ring 5. The ring 5 forms an element of the clutch and incloses and co-acts with a clutch element 6 which has its outer face of generally annular outline and is of radially expansible construction, being preferably made in structurally independent half sections 7, each having a circumference of slightly less than half a circle and of a curvature conformable to that of the inner face of the ring 5. The clutch element 6 is mounted upon the inner end of the shaft 1 and its sections are actuated to operatively connect the shafts 1 and 2 by a wedge means preferably comprising wedge fingers 8 projecting from a collar 9. The shaft 1 is formed with opposite, preferably parallel, flat faces 10 of suitable length, and the sections 7 are formed with longitudinal grooves 7' adjoining the faces 10. The wedge fingers 8 slide along the faces 10 and fit conformably in the grooves 7', thereby keying the member 6 to the shaft 1. The grooves 7' are preferably formed to exactly conform to the outline of the wedge fingers 8.

The wedge fingers act in opposition to bow springs 11 each of which is of curved outline and has an extent approximating that of half a circle. The bow springs 11 are carried by the driving ring 5, their ends engaging in transverse slits 12 which are formed in the inner circumferential face of said driving ring; and said bow springs are fitted in a circumferential groove 13 formed in the inner face of the driving ring 5 and in circumferential grooves 14 formed in the outer faces of the sections 7, being disposed partly in the groove 13 and partly in the grooves 14. The springs 11 tend to spring inwardly and thus to oppose the movement of the wedge fingers 8 in a direction to spread the sections 7.

The collar 9 is journaled in an operating sleeve 15 which is slidably mounted upon the shaft 1 and is preferably, though not necessarily, acted upon by a spring 16 which tends to move said sleeve toward the member 6. The sleeve 15 is, in turn, operated by a lever 17, the latter being pivoted at its lower or inner end to the sleeve 15 and above its pivotal connection with the sleeve 15, being mounted on a fixed pivot 18. The lever 17 projects through an opening in the casing 3 and preferably works in relation to a rack quadrant 19, being provided with a conventional pawl 20 for engagement with said quadrant.

When the sleeve 15 is positioned as far as possible from the member 6, the driving ring 5 will be practically free of said member and the shaft 1 may, therefore, rotate, without producing any rotation of the shaft 2. In order to operate the shaft 2, the sleeve 15 is moved toward the member 6, such movement of the sleeve 15 producing an inward movement of the wedge fingers 8, and the latter spreading or expanding the sections 7, as is obvious. As the sections 7 are spread or expanded by the wedge fingers 8, their frictional engagement with the springs 11 becomes sufficiently strong to cause a rotation of the shaft 2 consequent to the rotation of the shaft 1. Obviously, the speed at which the shaft 2 rotates is proportionate to the degree of frictional engagement between the sections 7 and the springs 11, the speed of the shaft 2 being higher as the frictional engagement of the springs 11 and the sections 7 is greater, and being lower as the frictional engagement of the springs 11 and sections 7 is less. Thus, in one position of the fingers 8 wherein said fingers will be substantially retracted from the member 6, the rotation of the shaft 1 will not produce any rotation of the shaft 2, but in the opposite extreme positions of the fingers 8 wherein said fingers are projected as far as possible into the member 6, the shaft 2 will rotate at a speed which is substantially equal to the speed of the shaft 1, and in intermediate positions of the fingers 8 the shaft 2 will be rotated by the shaft 1 but will have less speed of rotation than the shaft 1, this difference between the speed of rotation of the shafts 1 and 2 being obviously due to the slippage of the member 6 relatively to the springs 11. The springs 11 are sufficiently stout to have good wear-resisting properties and are sufficiently long and wide to have ample frictional engaging surfaces. When the fingers 8 are retracted from the member 6 the springs 11, which, as above stated, tend to spring inwardly, will obviously move the sections 7 toward one another, and as said sections are moved inwardly by the springs 11, their degree of frictional engagement with said springs will progressively decrease, as is obvious.

When the fingers 8 are projected as far as possible into the member 6 the shaft 2 will, as above stated, rotate at a speed which is substantially equal to the speed of the shaft 1. This is due, in the embodiment shown, not only to the fact that the springs 11, at such time, have their strongest frictional engagement with the sections 7, but also to the fact that the circumferential faces of the sections 7 at the sides of the grooves 14 bear uniformly throughout their extent with strong frictional pressure against the inner circumferential faces of the ring 5 at the sides of the groove 12.

The springs 11 prevent the changes from lower to higher speeds from being made too suddenly or from being accompanied by undue shocks, and, on the other hand, where the speed is changed from higher to lower, by virtue of their engagement with the sections 7, exercise a braking function and thus counteract the momentum of the vehicle and insure that the shaft 2 shall be substantially as responsive to the gearing when the speed is changed from higher to lower as it is when the speed is changed from lower to higher.

The transverse grooves or recesses 12 in which the ends of the springs 11 fit are arranged at such an angle or pitch as to insure that said springs shall form an efficient driving connection between the member 6 and the driving ring 5 and have such depth as to allow of the requisite play of the ends of the springs as the tension of the latter is decreased or increased and thus to prevent the springs from buckling consequent to changes in their curvature.

Having fully described my invention, I claim:—

1. The combination of driving and driven co-acting clutch elements, one comprising a ring and the other comprising a radially expansible member mounted within the ring, a shaft carrying the radially expansible member and having flat longitudinal faces, and wedge fingers mounted to slide along said flat faces and operative to expand said radially expansible member.

2. The combination of driving and driven co-acting clutch elements, one comprising a ring and the other comprising a disk mounted within the ring and formed in sections, a shaft carrying the disk and having flat longitudinal faces, and wedge fingers mounted to slide along said flat faces and operative to spread the sections of said disk.

3. The combination of driving and driven co-acting clutch elements, one comprising a ring and the other comprising a disk mounted within the ring and formed in sections, bow springs associated with one of said clutch elements and interposed between and conforming to the outline of the adjacent circumferential faces of said ring and said disk, a shaft carrying the disk, and means for spreading or expanding the sections of the disk.

4. The combination of driving and driven co-acting clutch elements, one comprising a ring and the other comprising a disk mounted within the ring and formed in sections, a shaft carrying the disk, the adjacent faces of the disk and the ring being circumferentially grooved, bow springs associated with the ring and interposed in said circumferential grooves and conforming to the outline thereof, and means for spreading or expanding the sections of the disk, the bow springs tending to spring inwardly.

5. The combination of driving and driven co-acting clutch elements, one comprising a ring and the other comprising a disk mounted within the ring and formed in sections, a shaft carrying the disk, the adjacent faces of the disk and the ring being circumferentially grooved, bow springs interposed in said circumferential grooves and conforming to the outline thereof, the ring having its inner face provided with transverse grooves and the bow springs having their ends fitted in said transverse grooves, the bow springs tending to spring inwardly, and means for spreading or expanding the sections of the disk.

6. The combination of driving and driven co-acting clutch elements, one comprising a ring and the other comprising a disk mounted within the ring and formed in sections, bow springs associated with one of said clutch elements and interposed between and conforming to the outline of the adjacent circumferential faces of said ring and said disk, a shaft carrying the disk and having flat longitudinal faces, and wedge fingers mounted to slide along said flat faces and operative to spread the sections of said disk.

7. The combination of driving and driven co-acting clutch elements, one comprising a ring and the other comprising a disk mounted within the ring and formed in sections, a shaft carrying the disk and having flat longitudinal faces, the disk sections having longitudinal grooves adjoining said flat faces, and wedge fingers working conformably in said grooves and mounted to slide along said flat faces, the wedge fingers keying the disk to the shaft and being operative to spread the sections of the disk.

In testimony whereof I have hereunto set my hand in presence of two subscribing witnesses.

OLIN M. ALEXANDER.

Witnesses:
A. A. BEAL,
B. J. AWTRY.